(12) United States Patent
Venkatachalam

(10) Patent No.: US 8,391,894 B2
(45) Date of Patent: Mar. 5, 2013

(54) METHODS AND APPARATUS FOR LOCATION BASED SERVICES IN WIRELESS NETWORKS

(75) Inventor: Muthaiah Venkatachalam, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 1054 days.

(21) Appl. No.: 11/475,294

(22) Filed: Jun. 26, 2006

(65) Prior Publication Data

US 2007/0298806 A1     Dec. 27, 2007

(51) Int. Cl.
 *H04W 24/00*     (2009.01)
(52) U.S. Cl. .......... 455/456.3; 455/414.3; 455/450; 370/352; 370/356
(58) Field of Classification Search ....... 455/456.1–457, 455/404.1–404.2, 414.1–414.3, 450–452.2; 370/352–356
See application file for complete search history.

(56) References Cited

U.S. PATENT DOCUMENTS

| | | | |
|---|---|---|---|
| 6,385,452 B1* | 5/2002 | Zadeh et al. | 455/440 |
| 6,961,367 B2* | 11/2005 | Simic et al. | 375/214 |
| 7,236,764 B2 | 6/2007 | Zhang et al. | |
| 7,424,293 B2* | 9/2008 | Zhu | 455/432.1 |
| 7,782,818 B2* | 8/2010 | Hurtta et al. | 370/331 |
| 7,787,891 B2* | 8/2010 | Taaghol et al. | 455/456.6 |
| 7,809,800 B2* | 10/2010 | Kim et al. | 709/217 |
| 8,107,973 B1* | 1/2012 | Sjothun | 455/456.3 |
| 8,150,397 B2* | 4/2012 | Khetawat et al. | 455/436 |
| 8,270,996 B2* | 9/2012 | Lim et al. | 455/456.3 |
| 2001/0009544 A1 | 7/2001 | Vanttinen et al. | |
| 2001/0021175 A1 | 9/2001 | Haverinen | |
| 2002/0123352 A1 | 9/2002 | Vayanos et al. | |
| 2002/0183071 A1 | 12/2002 | Shioda et al. | |
| 2003/0235163 A1* | 12/2003 | Montz et al. | 370/331 |
| 2005/0070306 A1* | 3/2005 | Kim et al. | 455/456.2 |
| 2005/0071058 A1 | 3/2005 | Salande | |
| 2005/0080921 A1 | 4/2005 | Lu | |
| 2005/0181805 A1* | 8/2005 | Gallagher | 455/456.1 |
| 2006/0194594 A1* | 8/2006 | Ruutu et al. | 455/456.5 |
| 2006/0267841 A1* | 11/2006 | Lee et al. | 342/463 |
| 2007/0055752 A1 | 3/2007 | Wiegand et al. | |
| 2007/0111746 A1* | 5/2007 | Anderson | 455/522 |
| 2008/0107092 A1 | 5/2008 | Taaghol et al. | |
| 2008/0108321 A1 | 5/2008 | Taaghol et al. | |
| 2008/0108336 A1 | 5/2008 | Venkatachalum et al. | |
| 2010/0184453 A1* | 7/2010 | Ohki | 455/456.3 |
| 2011/0159893 A1* | 6/2011 | Siomina et al. | 455/456.3 |

FOREIGN PATENT DOCUMENTS

KR     20030060195 A     7/2003

OTHER PUBLICATIONS

GSM Association, "Location Based Services," version 3.1.0, Jan. 2003, pp. 1-75.
Office Action mailed Oct. 22, 2009 in U.S. Appl. No. 11/648,178.
Office Action mailed Oct. 21, 2009 in U.S. Appl. No. 11/648,179.
Office Action mailed Oct. 23, 2009 in U.S. Appl. No. 11/648,177.

* cited by examiner

*Primary Examiner* — Sharad Rampuria
(74) *Attorney, Agent, or Firm* — Schwabe, Williamson & Wyatt, P.C.

(57) ABSTRACT

Embodiments of the present invention provide methods and apparatus for location based services provided through wireless networks. Other embodiments may be described and claimed.

20 Claims, 6 Drawing Sheets

METHODS AND APPARATUS FOR LOCATION BASED SERVICES IN WIRELESS NETWORKS

TECHNICAL FIELD

Embodiments of the present invention relate to the field of wireless networks, and more specifically, to methods and apparatus for location based services provided through wireless networks.

BACKGROUND

With advances in wireless networking technology, location based services (LBS) are aspired. One use for LBS is to support emergency services such as electronic 911 (E911) mandated by the U.S. Federal Government. Beyond E911, there are other commercial uses for LBS as well, such as, for example, location based commerce. Emergency service is considered as a non-subscription based service, provided by the network operator (NSP) or third-party IP service providers (ISP). This service does not require explicit authentication and authorization of the caller. Decisions on the access authentication for using emergency service and analysis of the security threats are for further study.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)". For the purposes of the present invention, the phrase "at least one of A, B, and C" means "(A), (B), (C), (A and B), (A and C), (B and C), or (A, B and C)". For the purposes of the present invention, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention provide methods and apparatus for location based services provided through wireless networks. The methods and systems described herein are not limited in this regard.

Figure 1:
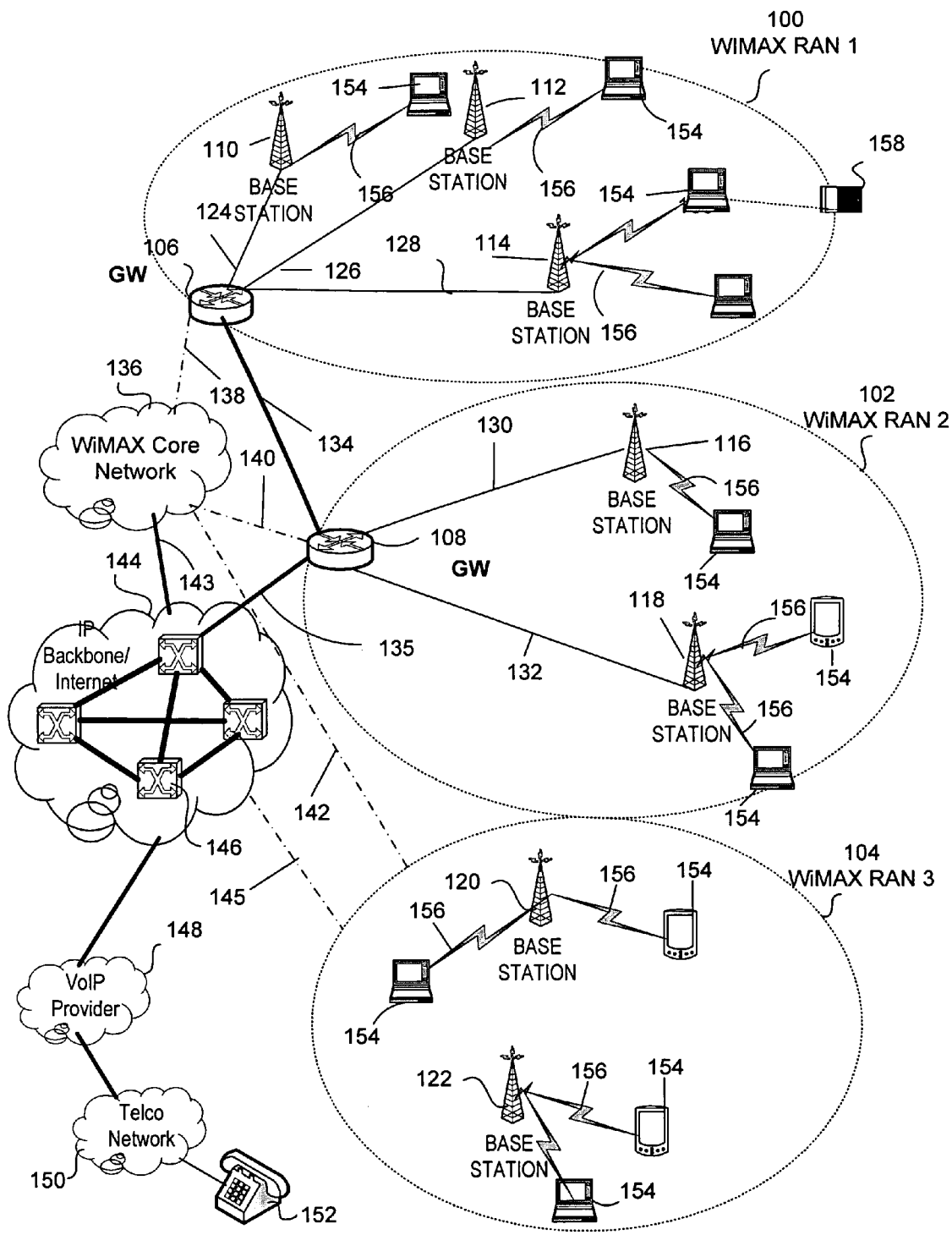
FIG. 1 is a schematic diagram of exemplary radio access networks (RAN) incorporated with the teachings of the present invention, in accordance with various embodiments.

To provide a clear and understandable description of embodiments of the present invention, a brief description of Internet Protocol (IP) based radio access networks (RANs) is provided below. Additionally, examples of methods and apparatus for location based services architectures are described with reference to RANs. It should be understood that principles and techniques of embodiments of the present invention may be employed for location services architectures of RAN networks such as, for example but not limited to, Worldwide Interoperability Microwave Access (WiMAX) networks, Wireless Fidelity (Wi-Fi) networks, Third Generation (3G) cellular networks and Ultra-wideband (UWB) networks. The IP based RANs of FIG. 1 are illustrated and described as WiMAX RANs for simplicity. Additionally, although some of the examples are described with respect to standards developed by Institute of Electrical and Electronic Engineers (IEEE), the methods and systems disclosed herein are not so limited, and are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), Ultra-wideband (UWB) Forum, etc.).

FIG. 1 illustrates simplified exemplary IP based RANs incorporated with the teachings of the present invention in accordance with various embodiments. A first WiMAX RAN 1 (100) is illustrated that includes a gateway (GW) 106 communicatively coupled to base stations 110, 112 and 114 via links 124, 126 and 128, respectively. A second WiMAX RAN 2 (102) is illustrated that includes a GW 108 communicatively coupled to base stations (BS) 116 and 118 via links 130 and 132, respectively. Each base station may include, for example, an omnidireactional antenna, an advanced antenna system or an antenna system based upon multiple input multiple output (MIMO) communications. A third WiMAX RAN 3 (104) is illustrated that does not include a gateway but does include two base stations 120 and 122.

In one example, mobile stations (MS) 154 access the networks (via an appropriate base station) using the Physical Layer (PHY) and Media Access Control Layer (MAC) features defined by the IEEE 802.16 family of standards (e.g., the IEEE std. 802.16-2004, published Sep. 18, 2004; the IEEE std. 802.16e, published Feb. 28, 2006; etc.). Exemplary MSs include notebook computers and hand-held wireless devices (e.g., personal digital assistants (PDAs), pocket PCs, cellular phones supporting 802.16 links, etc.).

To support station-side operations, each MS 154 provides an appropriate RAN interface, such as depicted by a PCM-CIA card 158 for a notebook computer. Optionally, the RAN wireless interface may be built into the MS 154. Each MS is illustrated communicatively coupled to a base station via a link 156.

In general, an MS 154 may access a RAN via some form of subscription service offered by a RAN service provider, although some RAN services might be provided free of charge, e.g., University campus, city coverage, etc. As such, GWs 106 and 108 are depicted as being communicatively coupled to and managed by a WiMAX core network 136 via links 138 and 140, respectively. Additionally, GWs 106 and 108 may be communicatively coupled to one another as depicted by link 134. RAN 104 is communicatively coupled to the WiMAX core network via its base stations 120 and 122 as depicted by link 142. It will be understood that the coupling between a given GW and WiMAX core network 136 may be via a dedicated link (e.g., private trunk or the like), or through another communication means, such as via IP backbone network 144, which includes multiple network elements 146 (e.g., backbone switches and routers), as depicted by links 135 and 145. WiMAX core network 136 is communicatively coupled to IP backbone network 144 via link 143.

A Voice over IP (VoIP) provider 148 is illustrated communicatively coupled to IP backbone 144 to enable phone calls to be carried over Internet infrastructure using a packetized transport. For illustrative purposes, the VoIP facilities depicted in FIG. 1 is represented by a VoIP provider network 148, a telecommunications (telco) network 150, and a telephone 152 (or other suitable device such as, for example, desktop computer, notebook computer and hand-held wireless devices (e.g., personal digital assistants (PDAs), pocket PCs, cellular phones)).

Figure 2:
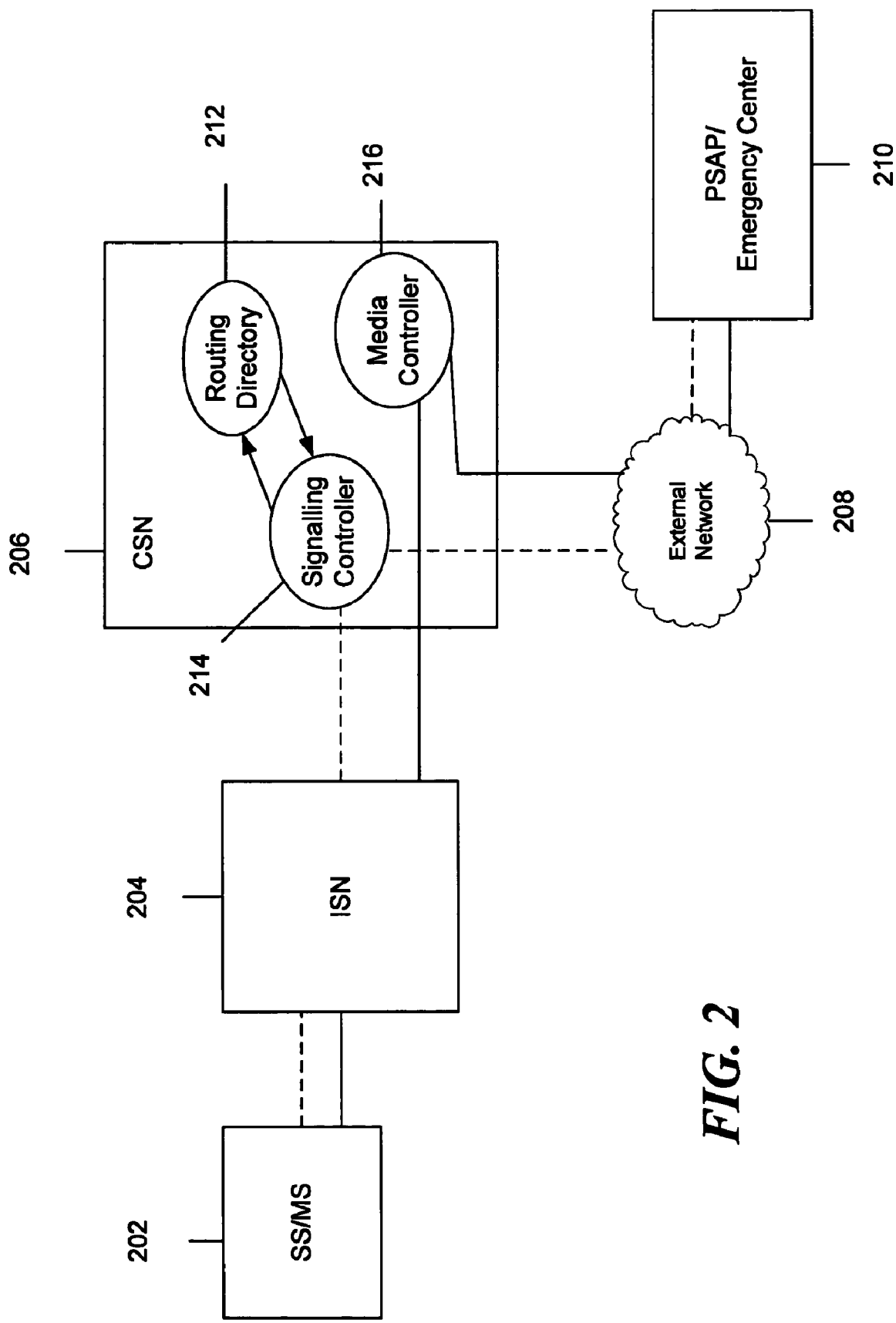
FIG. 2 is a schematic diagram of exemplary emergency service architecture incorporated with the teachings of the present invention, in accordance with various embodiments.

FIG. 2 provides a high level view of emergency service architecture in accordance with various embodiments of the present invention. Those skilled in the art will understand that such an architecture is applicable for other location based services. However, for simplicity and clarity, FIG. 2 is illustrated and described with reference to emergency services. The architecture includes a subscriber station/mobile subscriber station (MS) 202, an access service network (ASN) 204, a converged services network (CSN) 206, an external network 208 and a Public Safety Access Point (PSAP) or emergency 210, communicatively coupled to each other as shown. The CSN includes a routing directory 212, a signaling controller 214 and a media controller 216.

Generally, there are four exemplary operations involved for supporting emergency service. A first is the detection of an emergency request. Detection of the emergency request may be done by a MS or by network entities within the CSN based upon certain criteria outside the scope of the present invention.

A second operation involves location information. Caller location plays a central role in routing emergency calls. The location information may be communicated from the MS, a base station, ASN entities, or by some other means. The exact procedure on communicating location information as required by emergency service regulatory requirements is outside the scope of the present invention.

A third operation includes finding the location of the nearest PSAP. For practical reasons, each PSAP generally only handles calls for a certain geographic area. Also, for time sensitive requests such as emergency service, it is desirable to handle such a request locally. Upon contacting the PSAP, it forwards emergency calls to the emergency control center for the purpose of dispatching police, fire and rescue services. The address of the PSAP is based upon the caller's location information. The support is provided by the CSN through functional entities generally referred to as a "routing directory." This operation is assumed to be supported by the CSN for purposes of the present invention.

A fourth operation includes routing calls to the PSAP. Once the location of the caller and the address of the PSAP are identified, the request is routed to the PSAP. This operation is also assumed to be supported by the CSN for purposes of the present invention.

Prioritization of the access and network resources is generally required in order to support emergency services in a reliable manner. The selection of an appropriate quality of service (QoS) for prioritization required by emergency services is based upon the QoS framework described further herein. While the CSN operator may use an existing QoS signaling method within a framework in accordance with various embodiments of the present invention, explicit prioritization support for emergency services support is outside the scope of the present invention.

Figure 3:
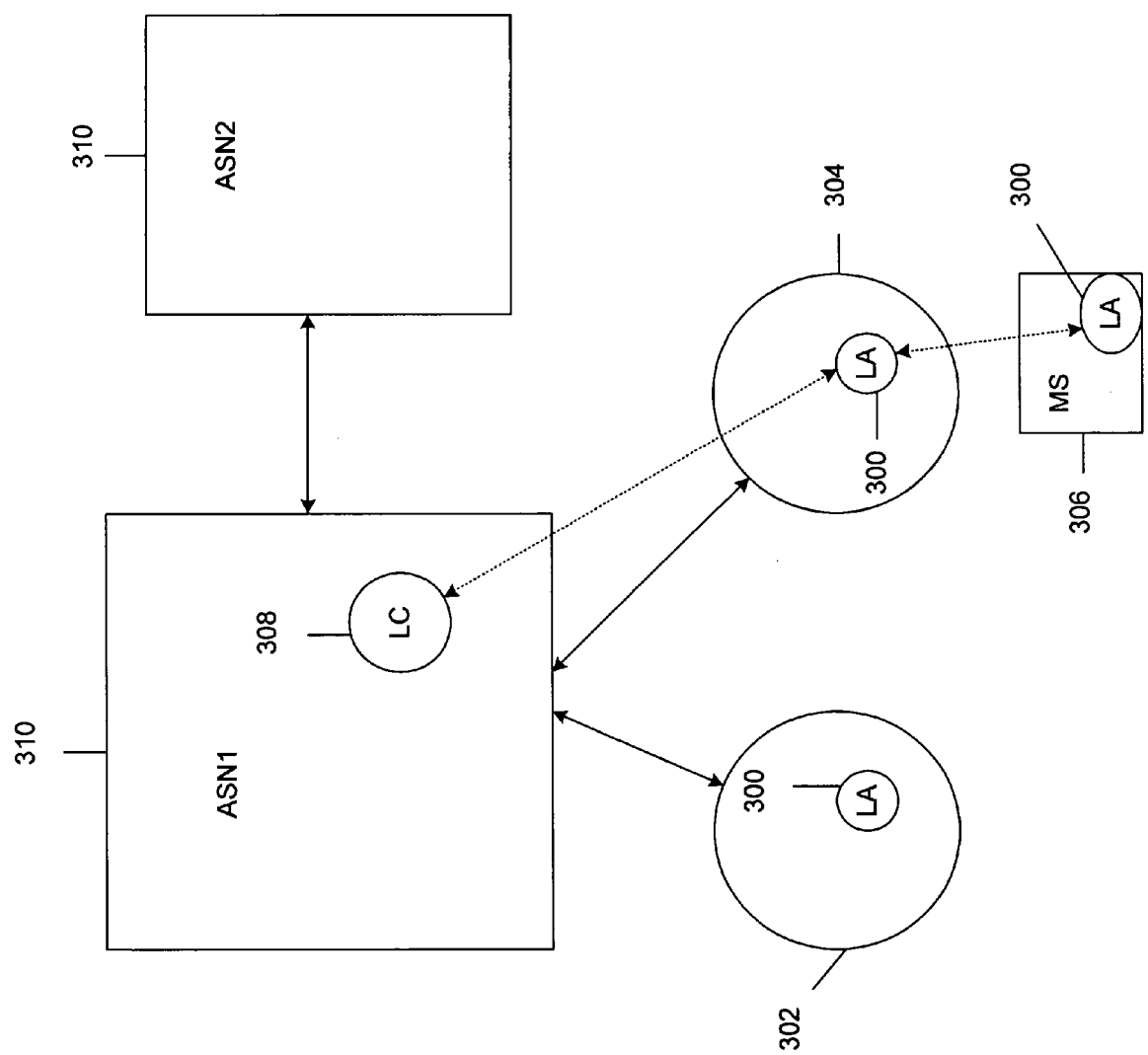
FIG. 3 is a schematic diagram of exemplary location architecture incorporated with the teachings of the present invention, in accordance with various embodiments.

Referring to FIG. 3, a location based services architecture for use in a wireless network or networks, in accordance with various embodiments of the present invention, may be described. The location architecture is "friendly" to both global positioning satellite (GPS) assisted location techniques at an MS, as well as other location techniques, such as, for example, observed time of arrival (OTOA), time difference of arrival (TDOA), angle of arrival (AOA), hybrid OTOA/TDOA, hybrid TDOA/AOA, etc., type location techniques.

As may be seen in FIG. 3, location agents (LA) 300 are provided and may reside in base stations 302. A location agent may also reside in the MS in a scenario where an MS uses GPS assistance for location determination as well as for scenarios where an MS performs location measurements on a downlink signal. A location controller (LC) 308 is also provided and may reside in an ASN gateway 310. It may also reside in a base station in certain deployment profiles. In instances where the location controller resides in a base station, a relay (not shown) is provided in the ASN gateway to communicate location related messaging between base stations.

Location agents are generally responsible for collection and reporting of location measurements, i.e., gathering data, and reporting back to the location controller. Location agents may also trigger the location measurements. A location controller is generally responsible for initiating and controlling the collection of location data for network initiated location requests, as well as the reporting of location data to the core network. A location controller may initiate the location requests. In instances where a location agent is located within the MS, location messaging may occur with messages that are generally defined in the IEEE 802.16e specification (2006) (e.g., scan messages).

General location messages include a location measurement radio request (LMRQ), location measurement radio response (LMRP), location request (LRQ), location response (LRP), and location parameters response (LPRP). LMRQs generally include a request for radio information that is required for starting a location measurement (e.g., frame number, sub-channel number, symbol range, etc., to perform the measurement). It is assumed that the MS will send an uplink MAC physical data unit at these pre-determined frame numbers, sub-channel numbers, symbol ranges, etc. LMRQ messages may also contain a request for neighboring base stations for a particular MS.

LMRPs generally include actual radio information required for starting a location measurement (frame number, sub-channel number, symbol range, neighboring base stations, etc.).

LRQs generally include a request to a location agent to start location measurement. LRQs also generally include actual radio information required for starting the measurement (frame number, sub-channel number, symbol range, etc.) LRQs are generally sent to the neighboring base stations the LC obtains via an LMRP. LRPs generally include an acknowledgment of an LRQ.

LPRPs generally include measured values that may be used to compute the exact location of the user. For example, such values may include measured time of arrival of a signal at the location agent, angle of arrival at the location agent, etc.

A location trigger may come from either the location agent, the location controller or the CSN based upon, for example, determining an emergency call has been made from the MS at the location agent or location controller, or from trapping requests at the location agent or location controller from the location aware application that may be running at the MS.

Figure 4:
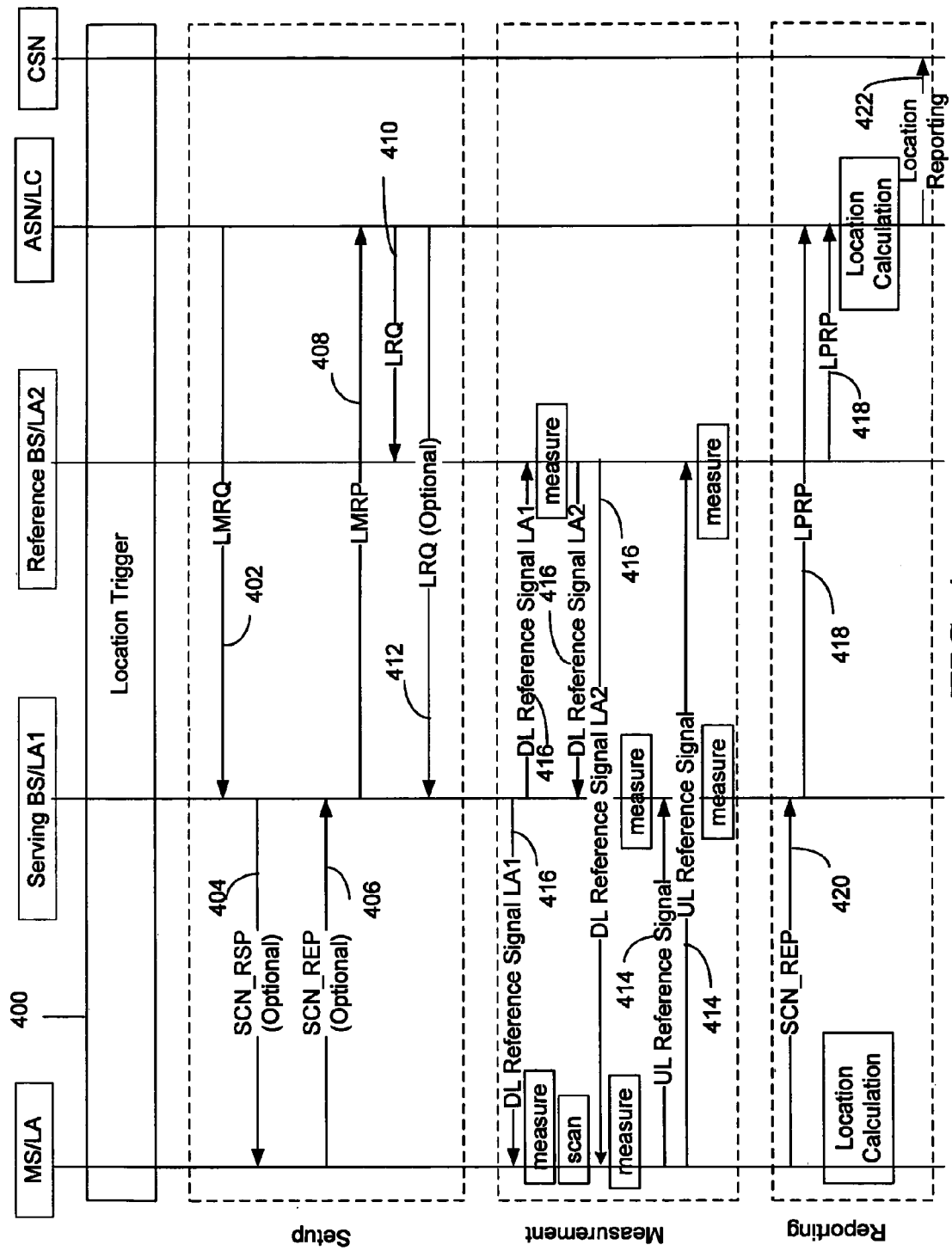
FIGS. 4-5 are a schematic diagram representations for various examples of message flow within a location based services architecture for a wireless network incorporated with the teachings of the present invention, in accordance with various embodiments.

Referring to FIG. 4, an example of call flows may be described, for a scenario where the MS does not include GPS assist, in accordance with various embodiments of the present invention. The example includes location triggering 400 occurring within the network, for example at the location controller, a base station or at the MS. A serving base station is generally the base station providing service to the MS. Only one reference base station (neighbor base station) is illustrated in this example, but those skilled in the art will understand that there may be more than one reference base station involved in the location measurement depending upon the type of and complexity of the measurements. The MS may or may not include a location agent depending upon the particular deployment.

During a set-up phase, at a first operation, in this example, the location controller contacts the serving base station's location agent and requests at least one radio parameter for location measurement via an LMRQ message 402. In a second operation, the serving base station may optionally request the MS to scan for neighbor base stations for this MS via a SCN_RSP message 404, in a scenario where the serving base station does not know the neighbor base stations for this MS. In a third operation, the MS may respond via SCN_REP 406 with a scanned list of neighbor base stations that the MS detects. In a fourth operation, the serving base station responds with radio parameters (frame number, sub-channel, symbol offset, neighbor base stations, etc., upon which the measurements are to be done) via an LMRP message 408.

In a fifth operation, the location controller sends an LRQ message 410 to location agents in a few other neighboring base stations (reference base stations—in this example, only one) to begin location values measurements. The LRQ message contains the radio parameters required for the measurements. An LRQ message 412 may also be sent to the serving base station; although it is optional since the serving base station generally already has the parameters needed for starting measurement. An LRP message (not shown) may be sent from a base station to acknowledge receipt of the LRQ message.

With regard to the LRQ messages sent to location agents in the base stations, the location controller may use IP multi-cast messaging to send a single copy of the LRQ message instead of sending multiple copies of the LRQ message via unicast messaging. Additionally, the LRQ message may not be sent to and received by the serving base station since the serving base station already has the required radio information and the required measurement trigger based upon its earlier transmission of the LMRP message. Additionally, if the MS does the location measurements on the downlink signal, then generally no set-up is needed.

In situations where the MS may by in an idle mode, the MS needs to be paged and brought back to a connected mode within the network before the location measurements and calculations may begin. If the MS initiates the location trigger, no such paging is necessary as the MS will reestablish communication within the network either prior to or after initiating the location trigger.

As previously noted, the location controller may reside in a base station (as opposed to the ASN gateway). In such instances, the serving base station itself may trigger the location measurement and contact neighboring base stations to serve as reference base stations with an LRQ message. In such cases, the location measurement triggering may occur quicker than the scenario where the location controller is located in the ASN gateway As previously noted, a serving base station may request at least one radio parameter from the MS via a scan message. Radio parameters are provided by the MS to the serving base station via a scan response. The radio parameters may be provided to the location controller, which may provide them to other base stations serving as reference base stations, as previously noted.

During a measurement phase, location measurement values may be obtained by receiving at least one protocol data unit (PDU) at one or more base stations and/or MS. The PDU(s) may be sent by the MS as uplink (UL) reference signals 414. Receipt of a PDU is analyzed by the location agent(s) by techniques such as, for example, OTOA, TDOA, AOA, hybrid OTOA/TDOA, hybrid TDOA/AOA, etc., to obtain the location measurement values.

Additionally, PDU(s) may be sent via downlink (DL) reference signals 416. In such a scenario, the location controller may be within the ASN gateway or within a base station, the MS includes a location agent and the serving base station includes a location agent. As previously noted, the MS does not include GPS assist. Location measurement values may be obtained by receiving at least one PDU at the MS from one or more base stations. The PDU(s) are sent by the serving base station location agent and possibly one or more location agents at reference neighbor base stations. Receipt of a PDU is analyzed by the location agent at the MS by techniques such as, for example, OTOA, TDOA, AOA, hybrid OTOA/TDOA, hybrid TDOA/AOA, etc., to obtain the location measurement values. Additionally, DL reference signals, from one of the serving or reference base stations, in addition to being measured by the MS, may be measured by the other reference or serving base stations to generate location measurement values for accuracy and time synchronization purposes, in addition to being sent to the MS.

An MS may need to scan for a base station and associate with a base station before it can measure a downlink signal from that particular base station, as evidenced by the scan box in FIG. 4. Hence the time difference between the transmissions of the downlink signal from two consecutive base stations may need to take into consideration any scan duration at the MS. Also, by doing measurement at the MS on the downlink signal, the MS may be able to scan and measure the downlink signals even if the base stations are transmitting at different radio frequencies.

In a reporting phase, the location agents at the base stations and the MS send any generated location measurement values, whether generated from UL reference signals, DL reference signals, or both, to the location controller. The base stations send the location measurement values to the location controller via an LPRP message 418. The MS may send any location measurement values it has generated to the serving base station via a SCN_REP message 420, which aggregates the measurements with any of its own and forwards all of the measurements to the location controller. Alternatively, the MS may send its location measurement values directly to the location controller. While FIG. 4 illustrates the location controller at an ASN gateway, the location controller, as previously noted, may be located at a base station. The location controller calculates the location of the MS with the received measurements. The location controller may forward the location of the MS to a CSN via a Location Reporting message 422. The location of the MS may also be calculated by the MS itself, which may forward the location to the location controller, either directly or via the serving base station.

Figure 5:
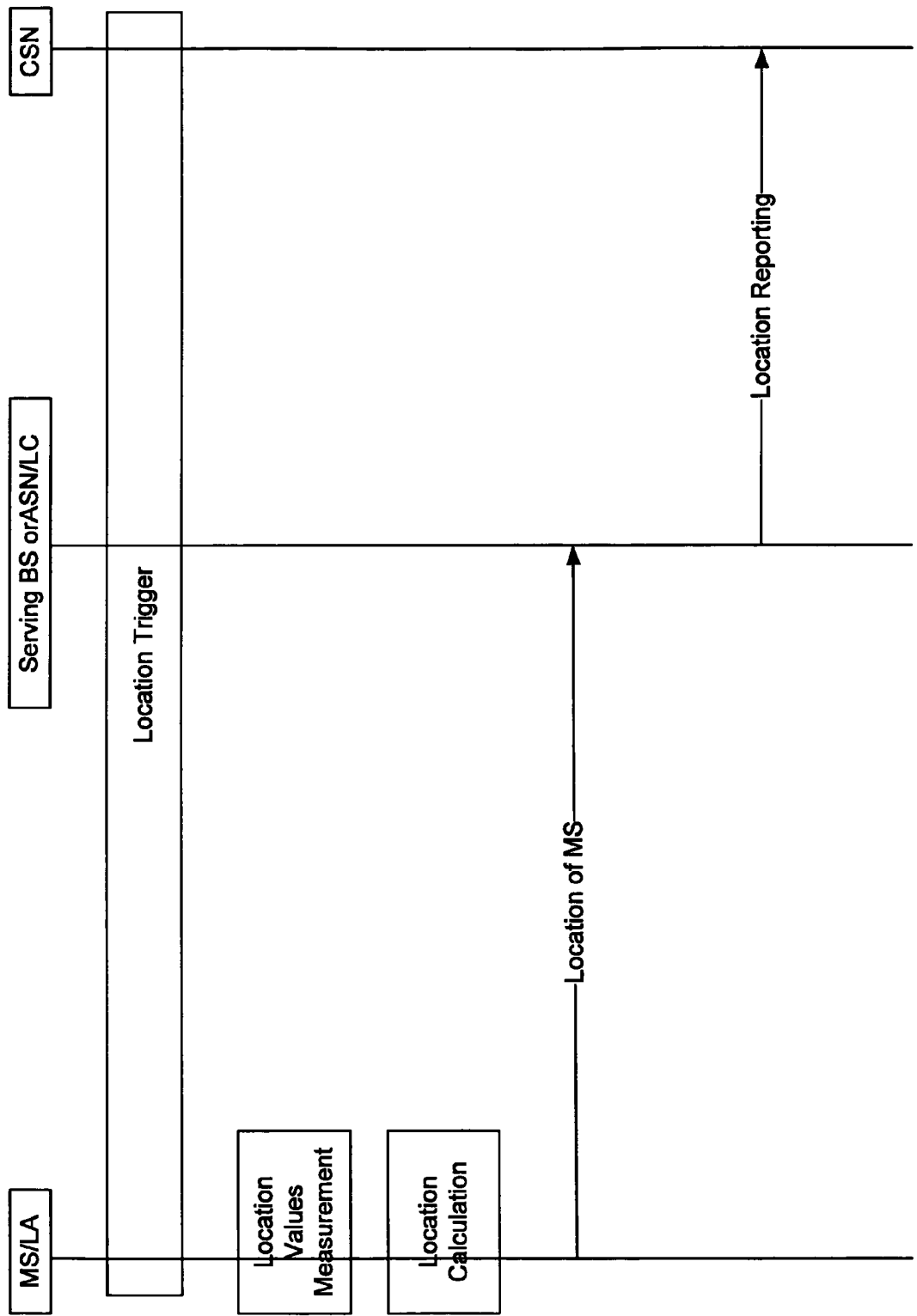

FIG. 5 illustrates an exemplary message flow, in accordance with various embodiments of the present invention, wherein the MS includes GPS assist and may actually measure the location by itself. In such a case, the location agent resides in the MS. The location controller may reside in a base station or in the ASN gateway. The location agent in the MS is capable of triggering the location measurement, doing the location measurement via GPS and simply reporting back the location of the MS to the location controller via a "location response" primitive.

Those skilled in the art will understand that the privacy of transmitted location information, as well as the location measurements themselves, is important. Hence, authentication techniques known in the art may be used prior to sending any information. Additionally, messages may be sent in an encrypted fashion.

Figure 6:
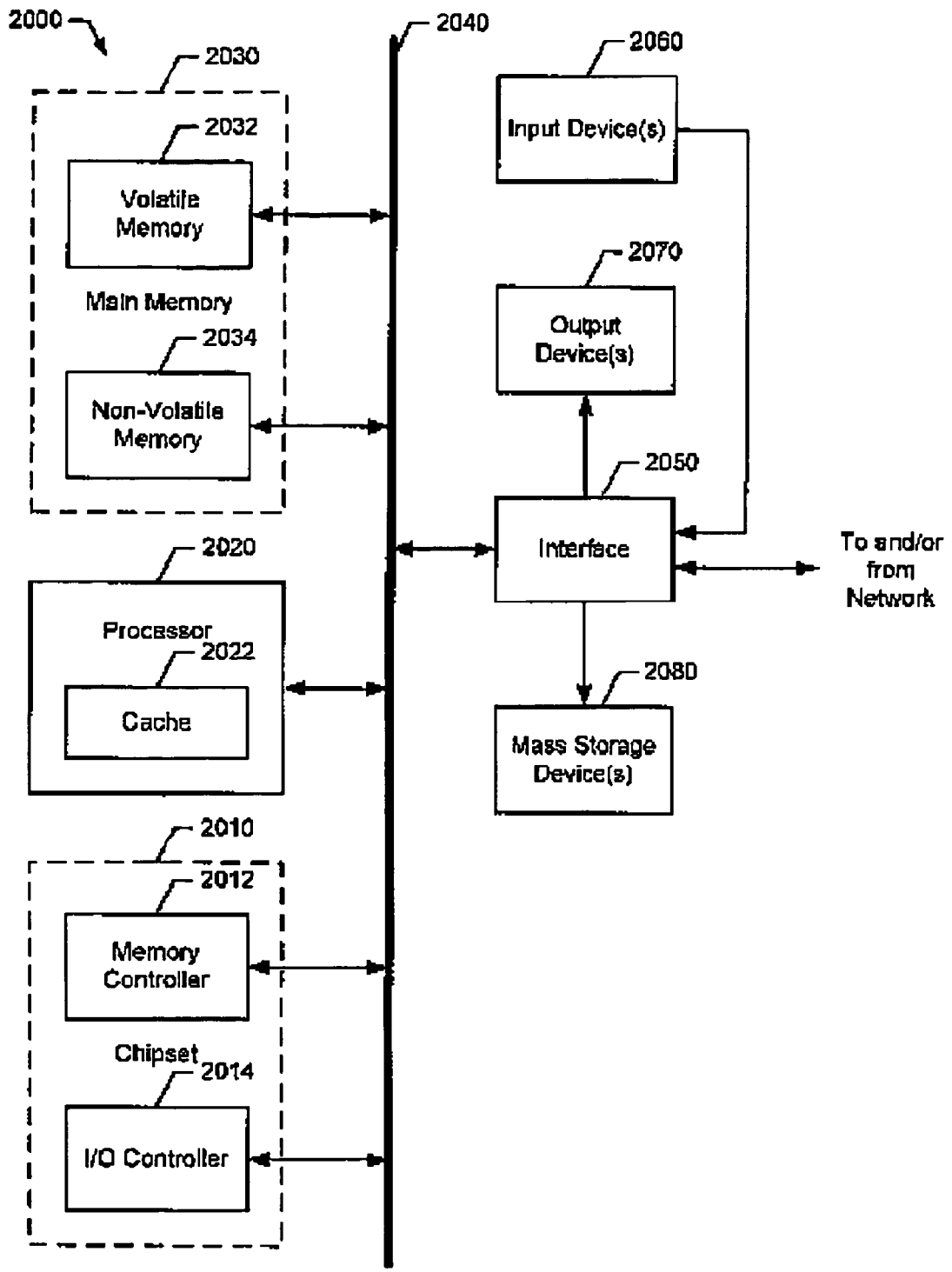
FIG. 6 is a block diagram representation of an example processor system that may be used to practice various aspects of the present invention.

FIG. 6 is a block diagram of an example processor system 2000 adapted to implement the methods and apparatus disclosed herein, in accordance with various embodiments. The processor system 2000 may be a desktop computer, a laptop computer, a handheld computer, a tablet computer, a PDA, a server, an Internet appliance, and/or any other type of computing device.

The processor system 2000 illustrated in FIG. 6 may include a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, Wireless Personal Area Network (WPAN) components, Wireless Local Area Network (WLAN) components, Wireless Metropolitan Area Network (WMAN) components, Wireless Wide Area Network (WWAN) components, and/or other suitable processing components. For example, the processor 2020 may be implemented using one or more of the Intel® Core™ technology, Intel® Pentium® technology, the Intel® Itanium® technology, the Intel® Centrino™ technology, the Intel® Core™ Duo technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device. In various embodiments designed to be used as a server, suitable for hosting the above described location controller function, main memory 2030 may include (a non-persistent copy of the) instructions implementing all or portions of the above described location controller function.

The processor system 2000 may also include an interface circuit 2050 that is coupled to the bus 2040. The interface circuit 2050 may be implemented using any type of interface standard such as an Ethernet interface, a universal serial bus (USB), a third generation input/output (3GIO) interface, and/or any other suitable type of interface. In various embodiments designed to be an MS or base station, selected aspects of the above described location based services may be implemented in interface circuit 2050, in addition to or in lieu of the endowment in chipset 2010.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives. In various embodiments designed to be used as a server, suitable for hosting the above described location controller function, mass storage device(s) may include (a non-persistent copy of the) instructions implementing all or portions of the above described paging controller function.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s)

2060, the output device(s) 2070, the mass storage device(s) 2080 and/or the network via the bus 2040 and the interface circuit 2050.

While the components shown in FIG. 6 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
    receiving, at a location agent (LA) located within a base station of an internet protocol (IP)-based wireless network, a location measurement radio request message, from a location controller (LC), the location measurement radio request message to request at least one radio parameter of a mobile station (MS) within the wireless network, wherein the at least one radio parameter comprises a frame number, sub-channel number, symbol range, or symbol offset;
    transmitting, from the base station, a request to the MS for a list of one or more neighboring base stations;
    receiving, from the MS, the list of one or more neighboring base stations;
    transmitting, from the LA, a location measurement radio response message, to the LC, that includes the at least one radio parameter for distribution to at least one other LA, the at least one other LA being located within a different base station of the one or more neighboring base stations;
    receiving, at the LA, a signal sent by the MS, the signal being sent based on the at least one radio parameter wherein receiving the signal comprises receiving at least one protocol data unit (PDU) sent from the MS as an uplink (UL) reference signal; and
    measuring, at the LA, the signal sent by the MS to obtain a location measurement, wherein measuring the signal comprises analyzing the at least one PDU to obtain the location measurement and wherein the location measurement is not a Global Positioning Satellite (GPS) location measurement; and
    transmitting, from the LA, the location measurement to the LC for use in calculating a location of the MS.

2. The method of claim 1, further comprising triggering, by the LA, a location determination for the MS.

3. The method of claim 1, wherein measuring, at the LA, comprises measuring a time of arrival of the signal at the LA.

4. The method of claim 1, wherein measuring, at the LA, comprises measuring an angle of arrival of the signal at the LA.

5. The method of claim 1, further comprising transmitting, from the LA, a request for the at least radio parameter from the MS.

6. The method of claim 5, further comprising receiving, at the LA, the at least one radio parameter from the MS.

7. An apparatus comprising:
    a receive block configured to receive, at a location agent (LA) located within a base station of an internet protocol (IP)-based wireless network, a location measurement radio request message from a location controller (LC), the location measurement radio request message to request at least one radio parameter of a mobile station (MS) within the wireless network, the receive block being further configured to receive a signal sent by the MS, the signal including at least one protocol data unit (PDU) sent from the MS as an uplink (UL) reference signal, the signal being sent based on the at least one radio parameter, wherein the at least one radio parameter comprises a frame number, sub-channel number, symbol range, or symbol offset;
    a transmit block configured to transmit a location measurement radio response message, from the LA to the LC, that includes the at least one radio parameter for distribution to at least one other LA, the at least one other LA being located within a different base station, the transmit block being further configured to transmit a location measurement to the LC for use in calculating a location of the MS, the transmit block being further configured to transmit a request to the MS for a list of one or more neighboring base stations, the one or more neighboring base stations including the different base station; and
    a control block configured to measure, at the LA, the signal sent by the MS to obtain the location measurement by analysis of the at least one PDU wherein the location measurement is not a Global Positioning Satellite (GPS) location measurement,
    wherein the receive block is further configured to receive, from the MS, the list of the one or more neighboring base stations.

8. The apparatus of claim 7, wherein the control block is configured to determine a time of arrival at the LA of the signal.

9. The apparatus of claim 7, wherein the control block is configured to determine an angle of arrival at the LA of the signal.

10. The apparatus of claim 7, wherein the transmit block is further configured to transmit a request for the at least radio parameter from the MS.

11. The apparatus of claim 10, wherein the receive block is further configured to receive the at least one radio parameter from the MS.

12. The apparatus of claim 7, wherein the control block is further configured to trigger a location determination for the MS.

13. The apparatus of claim 7, wherein the transmit and receive blocks are part of a transceiver having at least one common component.

14. The method of claim 1, wherein the IP-based network is configured to operate according to an Institute of Electrical and Electronic Engineers (IEEE) 802.16e standard.

15. The method of claim 2, wherein the location determination for the MS is triggered based upon an emergency call made from the MS.

16. The method of claim 1, wherein the location controller is located in an access service network (ASN) gateway of the IP-based wireless network.

17. The method of claim 1, wherein the location controller is located in the base station with the LA that receives the location measurement radio request message.

18. The method of claim 1, wherein the PDU is analyzed using a location technique that includes at least on of observed time of arrival (OTOA), time difference of arrival (TDOA), angle of arrival (AOA), hybrid OTOA/TDOA, and hybrid TDOA/AOA.

19. The method of claim 1, further comprising:
receiving, at the LA, at least one protocol data unit (PDU) from another LA located at the MS; and
analyzing, at the LA, the at least one PDU to obtain another location measurement.

20. The method of claim 1, further comprising:
receiving, at the LA, at least one protocol data unit (PDU) from the at least one other LA; and
analyzing, at the LA, the at least one PDU to obtain another location measurement.

* * * * *

UNITED STATES PATENT AND TRADEMARK OFFICE
CERTIFICATE OF CORRECTION

| | |
|---|---|
| PATENT NO. | : 8,391,894 B2 |
| APPLICATION NO. | : 11/475294 |
| DATED | : March 5, 2013 |
| INVENTOR(S) | : Muthaiah Venkatachalam |

It is certified that error appears in the above-identified patent and that said Letters Patent is hereby corrected as shown below:

In the Claims

Column 10
Lines 51-52, Claim 10, "...the at least radio parameter..." should read --...the at least one radio parameter...--.

Column 11
Line 8, Claim 18, "...at least on of..." should read --...at least one of...--.

Signed and Sealed this
Fifth Day of May, 2015

Michelle K. Lee
*Director of the United States Patent and Trademark Office*